(12) United States Patent
Chisenga et al.

(10) Patent No.: US 7,626,834 B2
(45) Date of Patent: Dec. 1, 2009

(54) DOUBLE ENDED CONVERTER WITH OUTPUT SYNCHRONOUS RECTIFIER AND AUXILIARY INPUT REGULATOR

(75) Inventors: Lesley Chisenga, Cambridge (GB); Asim Mumtaz, Cambridge (GB); Gehan Amil Joseph Amaratunga, Cambridge (GB)

(73) Assignee: Enecsys Limited, Cambridge, Cambridgeshire ( * ) Notice: Subject to any disclaimer, the term of this patent is extended or adjusted under 35 U.S.C. 154(b) by 155 days.

(21) Appl. No.: 11/771,593

(22) Filed: Jun. 29, 2007

(65) Prior Publication Data

US 2008/0055952 A1    Mar. 6, 2008

(51) Int. Cl.
H02M 3/335    (2006.01)
H02M 7/538    (2007.01)

(52) U.S. Cl. .......................... 363/25; 363/134
(58) Field of Classification Search ............ 363/24, 363/25, 26, 134, 139, 89, 86
See application file for complete search history.

(56) References Cited

U.S. PATENT DOCUMENTS

| | | | |
|---|---|---|---|
| 4,479,175 A | 10/1984 | Gille et al. | |
| 4,772,994 A | 9/1988 | Harada et al. | |
| 6,021,052 A | 2/2000 | Unger et al. | |
| 6,445,599 B1 * | 9/2002 | Nguyen | 363/25 |
| 6,807,069 B2 * | 10/2004 | Nieminen et al. | 363/17 |
| 6,888,728 B2 * | 5/2005 | Takagi et al. | 363/17 |
| 7,450,401 B2 | 11/2008 | Iida | |
| 7,466,566 B2 | 12/2008 | Fukumoto | |
| 2003/0193821 A1 | 10/2003 | Krieger et al. | |

FOREIGN PATENT DOCUMENTS

| | | |
|---|---|---|
| EP | 0 340 006 A2 | 11/1989 |
| GB | 1261838 | 1/1972 |
| GB | 1 571 681 | 7/1980 |
| JP | 01311874 A | 12/1989 |
| JP | 2000232793 A | 8/2000 |
| RU | 2 234 791 C1 | 8/2004 |
| WO | WO 82/02134 | 6/1982 |
| WO | WO 84/03402 | 8/1984 |
| WO | WO 92/07418 | 4/1992 |

OTHER PUBLICATIONS

Search Report for corresponding GB 0712536.2, completed Sep. 24, 2007.
Xiaofeng Sun, Weiyang Wu, Xin Li, Qinglin Zhao: A Research on Photovoltaic Energy Controlling System with Maximum Power Point Tracking:; Proceedings of the Power Conversion Conference-Osaka 2002 (Cat. No. 02TH8579) IEEE-Piscataway, NJ, USA, ISBN 0-7803-7156-9, vol. 2, p. 822-826, XP010590259: the whole document.

* cited by examiner

Primary Examiner—Shawn Riley

(57) ABSTRACT

A DC to AC power converter is disclosed. The power converter has four power-switching devices, two diodes, a step-up and isolation transformer, a capacitor-choke filter and a controller. Two power-switching devices located on the primary side of the transformer are switched to provide alternate cycles of an ac current to the primary side of the transformer, which magnetically couples the ac current to the secondary side of the transformer. Two power-switching devices on the secondary side of the transformer are switched to alternately allow the forward and return ac currents from the secondary side of the transformer in the output path to a load connected to the output of the DC to AC power converter.

34 Claims, 9 Drawing Sheets

US 7,626,834 B2

DOUBLE ENDED CONVERTER WITH OUTPUT SYNCHRONOUS RECTIFIER AND AUXILIARY INPUT REGULATOR

RELATED APPLICATIONS

This application claims priority from British patent application numbers GB0612859.9 filed Jun. 29, 2006 and GB0712536.2 filed Jun. 28, 2007, which are incorporated herein by reference.

FIELD OF INVENTION

This invention generally relates to DC to AC power converters. In particular, this invention relates to DC to AC power converters suitable for stand-alone use and for connection to a power grid.

BACKGROUND

Broadly speaking, DC to AC power converter converts DC power received at an input to AC power for outputting to a load. Typically, DC to AC power converters comprise a plurality of power switching devices, a transformer, a rectifying circuit, an intermediate DC stage and an output current shaping circuit. A plurality of power switching devices in the input path to the transformer are switched to convert the DC input voltage to an AC current, which is magnetically coupled by the transformer to the output side of the transformer.

Typically, the ac current in the output path of the transformer is full-wave rectified, for example using a rectifying diode bridge, to produce an intermediate DC signal in an intermediate DC stage, such as a Buck stage. The intermediate DC signal is current-shaped by switching a plurality of power switching devices in order to shape the output current to conform to a desired ac output current waveform. In such a configuration, the number of power switches is large, typically 8 to 12 or more.

We have appreciated the problems associated with using a large number of power switches in such a DC to AC power converter. The large number of power switching devices and the circuits necessary to control such devices decrease the overall efficiency of the circuit as each power-switching device has associated losses intrinsic to the device. Therefore, the larger the number of switching devices, the larger the losses and the lower the efficiency.

We have appreciated the need to reduce the number of power switching devices used in a DC to AC power converter.

SUMMARY

According to the present invention, there is provided a dc-to-ac power converter, the converter including a transformer having a primary and a secondary winding, the primary winding of said transformer being coupled to a dc input of said power converter and the secondary winding of said transformer being coupled to an ac output of said converter, and wherein the converter further comprises: a first pair of switches on said primary side of said converter, coupled between said dc input and said primary winding, to convert a dc supply from said dc input to an ac current for driving said transformer; a second pair of switches on said secondary side of said converter coupled between said secondary winding and said ac output, one in a forward path to said ac output and one in a return path from said ac output; a diode coupled across each of said secondary side switches; and a controller configured to control said primary and secondary side switches to convert a dc supply at said dc input to an ac supply at said ac output.

Embodiments of the present invention have the advantage of reducing the number of switches when compared to typical DC to AC power converters. Embodiments of the present invention also have an advantage in that the intermediate DC stage has been removed.

The present invention also provides a dc-to-ac power converter for providing an ac mains voltage power supply from a lower voltage dc input, the said power converter lacking an intermediate high voltage dc stage and comprising no more than four power switching devices, a first pair of power switching devices on a dc input side of said dc-to-ac converter and a second pair of power switching devices on an ac output side of said dc-to-ac converter.

The present invention further provides a system to convert a dc voltage input to an ac approximately sinusoidal current for a dc-to-ac power converter, the system comprising: a dc input with a pair of dc input terminals; a transformer having a primary winding with a tap and a second, output winding to provide said ac current; a pair of switches each coupled to one of said input terminals and to a respective end of said primary winding, said tap being connected to the other of said pair of dc input terminals; and a controller configured to control each of said pair of switches in turn during respective first and second half cycles of said approximately sinusoidal current using a pulse width modulated control such that each of said switches generates a current to approximate one of said half cycles of said approximate sinusoid; said system having an output from said output winding.

The present invention further provides a DC-to-AC power converter, the converter including a transformer having a primary and a secondary winding, the primary winding of the transformer being coupled to a dc input of the power converter and the secondary winding of the transformer being coupled to an ac output of the converter, and wherein: a first and second switch connected to the primary winding of the transformer to convert a dc supply from the dc input to an ac current for driving the transformer; a first and second switch connected to the secondary winding of the transformer such that the first switch is in a forward path to the ac output and the second switch is in a return path to the ac output; a first and second diode coupled across the respective first and second switches connected to the secondary winding; and wherein the first switch connected to the primary winding of the transformer is controlled to provide a first half cycle of an ac voltage to the primary winding of the transformer; the second switch connected to the primary winding of the transformer is controlled to provide a second half cycle of an ac voltage to the primary winding of the transformer; and the first and second switches connected to the secondary winding of the transformer as switched to alternately conduct the first and second half cycles of the signal coupled from the primary winding of the transformer to the secondary winding of the transformer.

The invention still further provides a controller for controlling a DC to AC power converter, the power converter comprising a transformer having a primary winding and a secondary winding, a first and second switch connected to the primary winding of the transformer, a first switch connected to the secondary winding of the transformer in the forward path to an ac output and second switch connected to the secondary winding of the transformer in the return path to the ac output, and a first and second diode coupled across the respective first and second switches connected to the secondary winding; the controller comprising: a plurality of outputs to control each of the first and second switches connected to the primary winding of the transformer and first and second switches connected to the secondary winding of the transformer; wherein the controller controls the first and second switches connected to the primary winding of the transformer to convert a dc input to an ac current to drive the primary winding of the transformer; the controller controls the first and second switches connected to the secondary winding of the transformer to alternately conduct the first and second half cycles of the signal coupled from the primary winding of the transformer to the secondary winding of the transformer.

In embodiments of the present invention, the dc-to-ac power converter or system further comprises a non-electrolytic capacitor energy storage capacitor on a dc side of said converter or system.

Preferably, the above converter or system further comprises a boost converter coupled to the dc input to said converter or system, and wherein said non-electrolytic capacitor is coupled across an output of said boost converter.

The present invention also provides a dc-to-ac power converter having a dc input, a dc-to-ac conversion stage having an input coupled to said dc input and an ac output coupled to an output of said dc-to-ac conversion stage, and further comprising a non-electrolytic energy-storage capacitor coupled to said input of said dc-to-ac conversion stage.

Preferably, the power converter further comprises a boost converter coupled between said dc input and said conversion stage input.

Preferably, the power conversion stage comprises a first stage operating at a first frequency and coupled to a second stage operating at a frequency of said ac output, said first frequency having higher than said output frequency. Preferably, said first frequency is 10, 100 or 1000 times higher than said output frequency.

Preferably, said first stage is configured to convert a dc to an ac current. Preferably, said ac output is a single phase output.

The present invention also provides a dc-to-ac power converter having a dc input, a dc-to-ac conversion stage having an input coupled to said dc input and an ac output coupled to an output of said dc-to-ac conversion stage, wherein said dc-to-ac conversion stage comprises a plurality of MOS switching devices, and wherein all of said switching devices are referenced to ground when switched on.

The present invention also provides a dc-to-ac power converter having a dc input, a dc-to-ac conversion stage having an input coupled to said dc input and an ac output coupled to an output of said dc-to-ac conversion stage, wherein said dc-to-ac conversion stage comprises a plurality of MOS switching devices, and wherein said switching devices are driven without level shifting.

The present invention also provides a dc-to-ac power converter having a dc input, a dc-to-ac conversion stage having an input coupled to said dc input and an ac output coupled to an output of said dc-to-ac conversion stage further comprising a boost converter coupled between said dc input and said conversion stage input, wherein said dc-to-ac conversion stage comprises a plurality of MOS switching devices, and wherein said boost converter comprises at least one MOS switching device, and wherein said boost converter switching device is a vertical device and wherein said dc-to-ac conversion stage devices are lateral devices.

Preferably, said vertical device and said lateral devices are fabricated on a single integrated circuit.

The present invention further provides a dc-to-ac power converter having a dc input, a dc-to-ac conversion stage having an input coupled to said dc input and an ac output coupled to an output of said dc-to-ac conversion stage and further comprising an input stage coupled between said dc input and said conversion stage input, and wherein said input stage is selectably configurable between a boost converter and a buck converter.

The present invention still further provides a dc-to-ac power converter having a dc input, a dc-to-ac conversion stage having an input coupled to said dc input and an ac output coupled to an output of said dc-to-ac conversion stage and further comprising an input stage coupled between said dc input and said conversion stage input, and wherein said input stage is selectably configurable such that the converter is configured to operate in either an on-grid configuration or an off-grid, battery powered configuration.

The present invention also provides an integrated circuit comprising at least one power switching device, a diode, and at least one second switching device connected such that in a first configuration said integrated circuit has terminals for connecting to external components including at least a coil and a capacitor to implement a boost converter and such that in a second configuration, which when said terminals are connected in the same way, implements a back converter and further comprising a controller, the controller having an input for selecting between said two configurations.

BRIEF DESCRIPTION OF THE DRAWINGS

These and other aspects of the invention will now be further described, by way of example only, with reference to the accompanying figures, in which.

DETAILED DESCRIPTION

Figure 1:
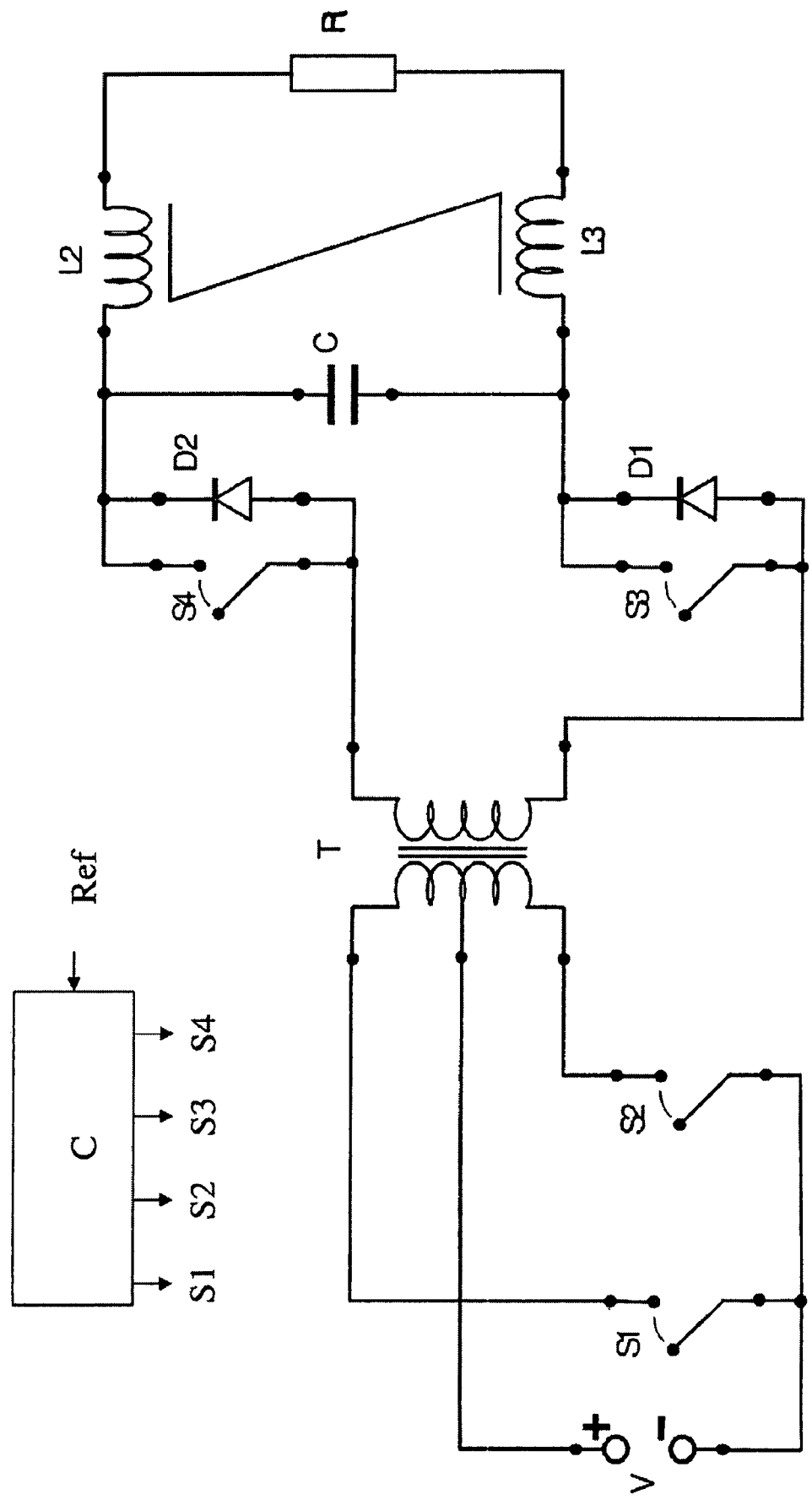
FIG. 1 shows a DC to AC power converter according to the present invention.

FIG. 1 shows a basic circuit of the DC to AC power converter. The circuit shown comprises four switches (S1, S2, S3, S4), two diodes (D1 and D2), a step-up and isolation transformer (T) and a capacitor-choke filter (C, L2 and L3). A controller C provides signals to drive the four switches and optionally has a reference input to sense an input signal. Two switches S1 and S2 are located at the primary side of the transformer T, which has two primary windings. One end one primary winding is connected to the other end of the other primary winding and the DC source positive rail. The other end of each primary winding is connected to a terminal of either S1 or S2. The other terminals of S1 and S2 are connected to the ground.

Two further switches, S3 and S4, are connected to the secondary winding of the transformer. Diodes D1 and D2 are connected across the switches S3 and S4 respectively. The cathode end of D2 is also connected to the one end of the capacitor C and the choke L2. The other end of the diode is also connected to one end of the transformer secondary winding. The other end of L2 is connected to the load. Similarly, the anode end of D1 is connected to the other end of the transformer secondary winding. The cathode end is connected to the remaining terminal of the capacitor and the choke L3. The other end of the choke L3 is connected to the load; this completes the transformer secondary circuit.

Principle of Operation

Figure 2:
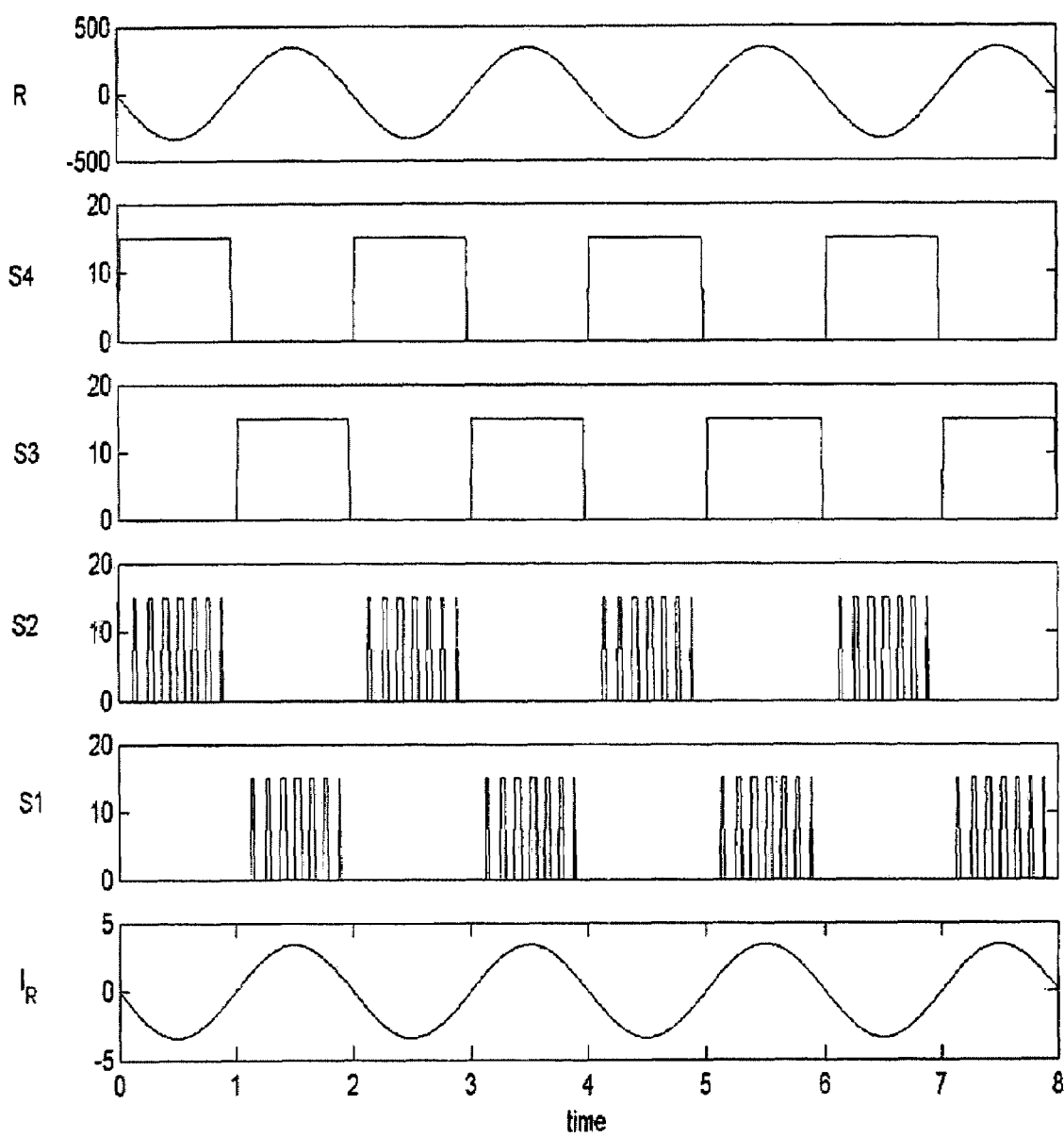
FIG. 2 shows a set of waveforms illustrating the operation of the DC to AC power converter.

FIG. 2 illustrates the waveforms during operation of the above circuit. A voltage high indicates that a switch is closed and a low indicates otherwise. Switches S3 and S4 close and open alternately, thereby producing complementary waveforms as shown in FIG. 2. S3 and S4 are should not be closed together at any time. The switching frequency of S3 and S4 is lower than that of S1 and S2. During the time that S3 is closed, S1 closes and opens several times, producing a train of pulses. S2 remains open during this period. S3 and S1 then open. Following a short period of rest S4 closes. S2 then closes and opens several times to produce a train of pulses similar to that produced by S1. The signals controlling S3 and S4 can be generated using a reference similar to R in FIG. 2. S3 is closed only when reference is below zero and S4 is closed only when reference is above zero. In the case of using a half sinusoidal pulse width modulation (PWM) switching for S1 and S2, a sinusoidal waveform current IR flows through the load R in FIG. 1.

Electronic Circuit Implementation

Figure 3:
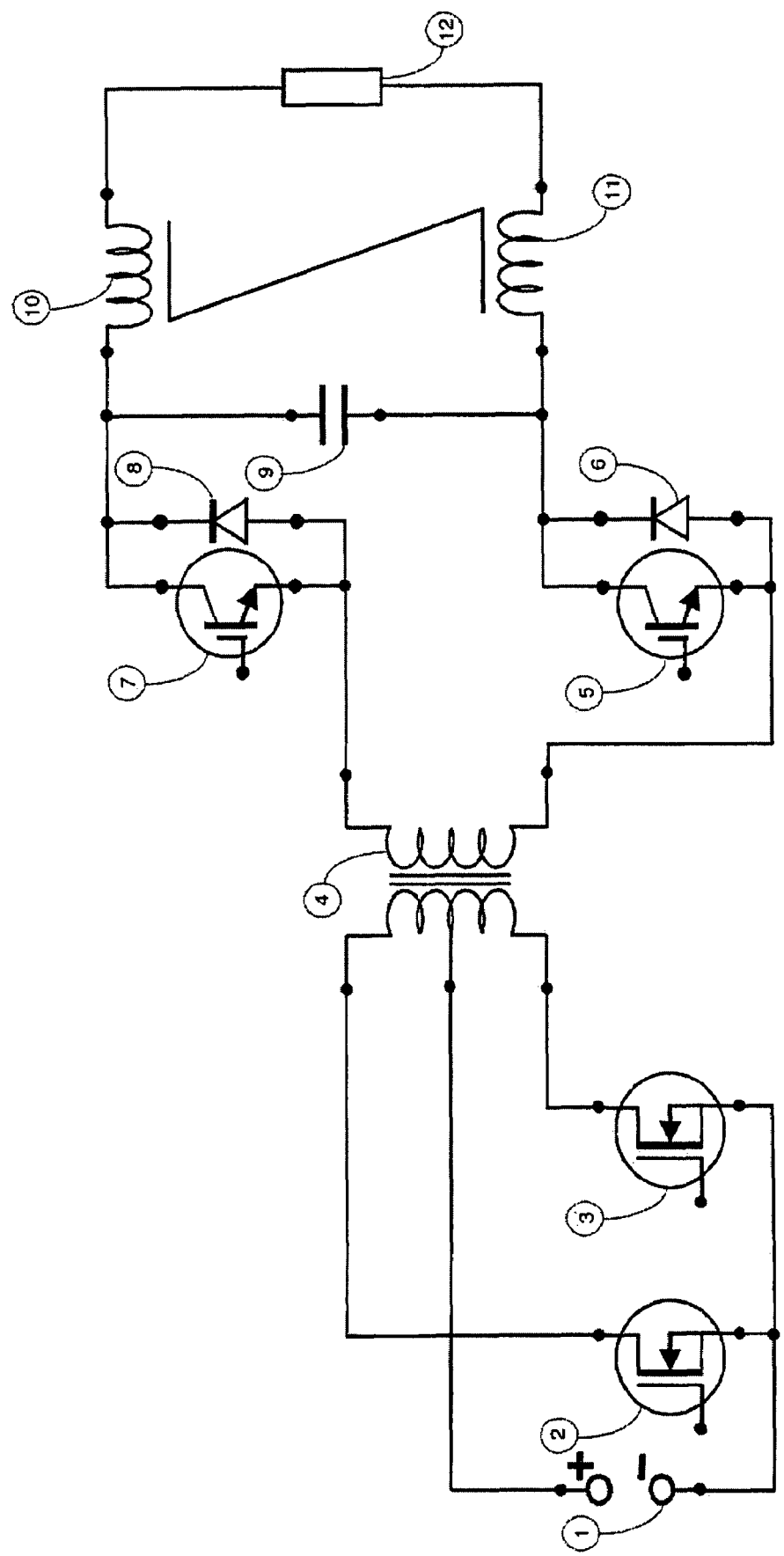
FIG. 3 shows an implementation of the DC to AC power converter according to the present invention.
Figure 4:
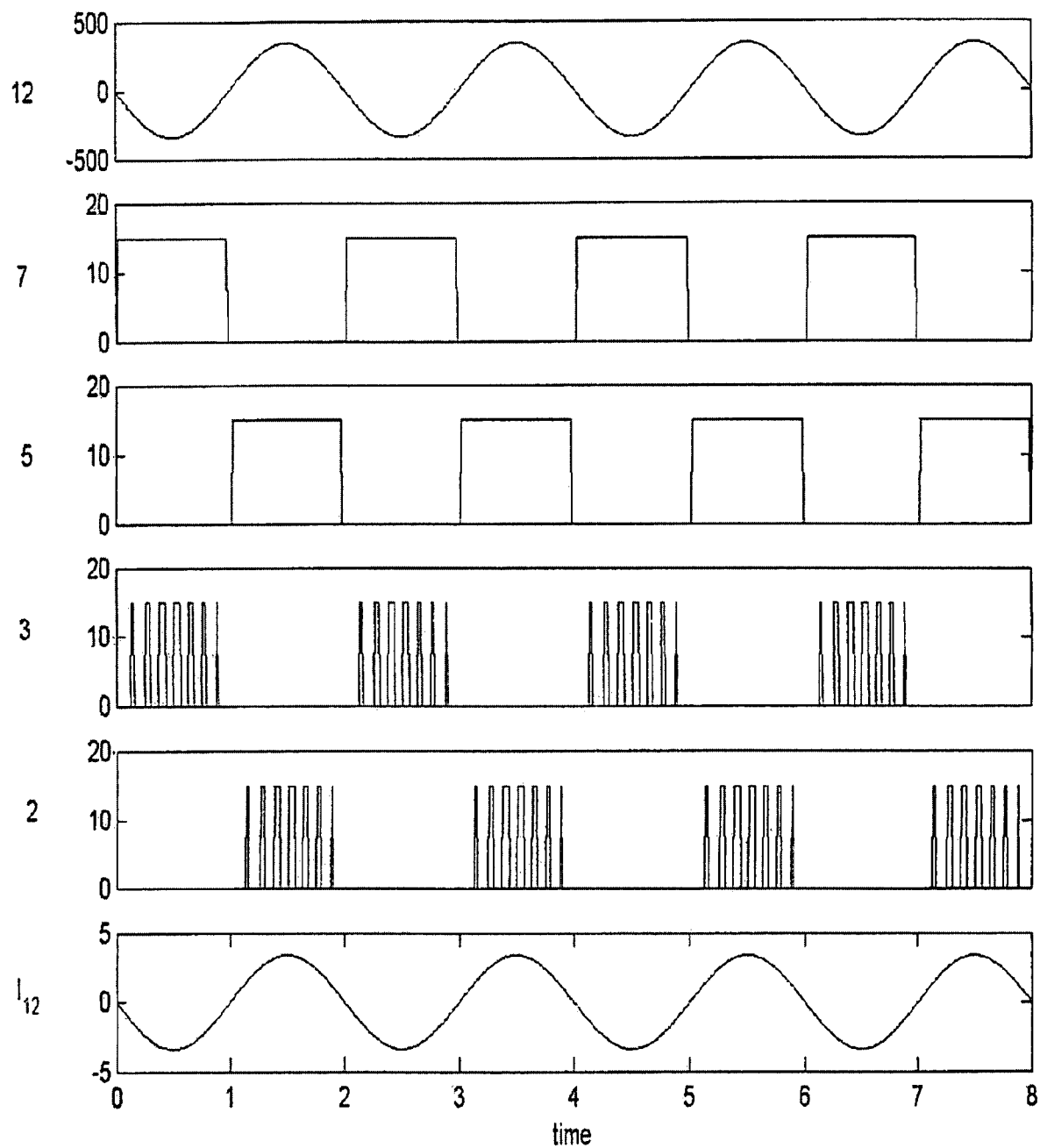
FIG. 4 shows a set of waveforms illustrating the operation of the DC to AC power converter of FIG. 3.

The switches S1 and S2 can be implemented using metal oxide field effect transistors, MOSFETs. Similarly the switches S3 and S4 can be implemented using the insulated gate bipolar transistors, IGBTs or MOSFETs. FIG. 3 shows the circuit configuration using these devices. The controller C has been removed for the sake of clarity. FIG. 4 shows the switching waveforms for the circuit. The signals 5 and 7 are the gate signals to the respectively numbered transistors in FIG. 3. The signals 2 and 3 are the gate signals to the respectively numbered transistors in FIG. 3. The gate signals are all low side as the reference is taken to be the source terminal of each transistor. The source terminals of all the transistors are grounded with respect to each circuit segment on which they are located. This implies that the anode of diode 8 is the ground line for transistor 7. Similarly the anode of diode 6 is the ground line of transistor 5. On the primary side of the transistor, the transistor source terminals are connected to the power source ground line. As shown in FIG. 4 a current 112 flows in the load 12 when a sinusoidal PWM signal is used for control of transistors 2 and 3.

Modes of Operation

Figure 5:
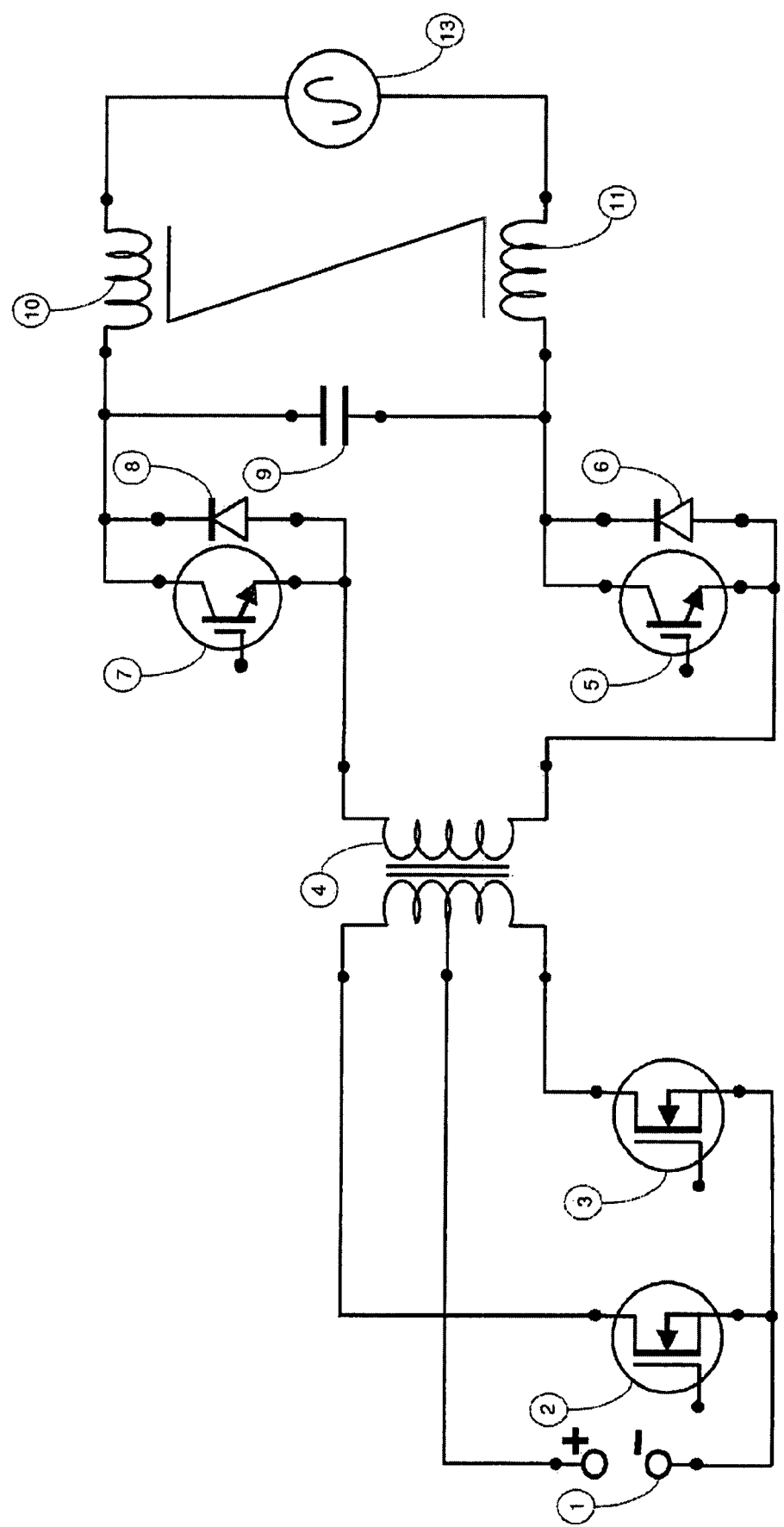
FIG. 5 shows an implementation of the DC to AC power converter in grid-connected operation according to the present invention.
Figure 6:
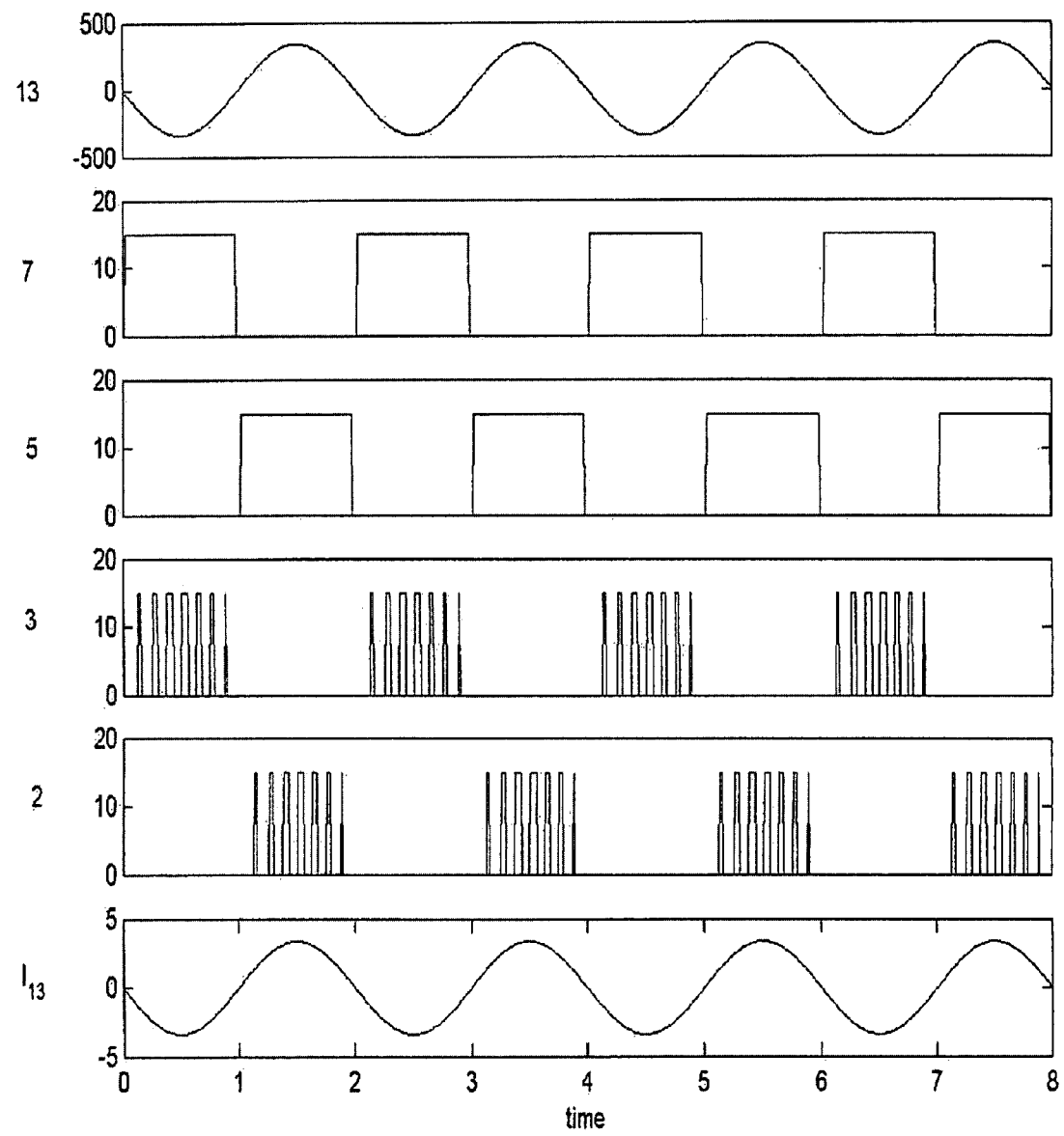
FIG. 6 shows a set of waveforms illustrating the operation of the DC to AC power converter of FIG. 5.

The circuit presented can be used in stand-alone mode, in which case the connected load is passive. FIG. 5 shows an implementation of the circuit in the stand-alone mode. The controller has been removed for the sake of clarity. In the stand-alone mode the load may be purely resistive or may have capacitive and/or inductive elements. The gate signals for transistors 5 and 7 are provided by the controller in response to a reference signal input to the controller. The reference signal may, for example, be provided by onboard reference signal. The frequency of the reference signal in this mode can be adjusted to any suitable range.

Figure 7:
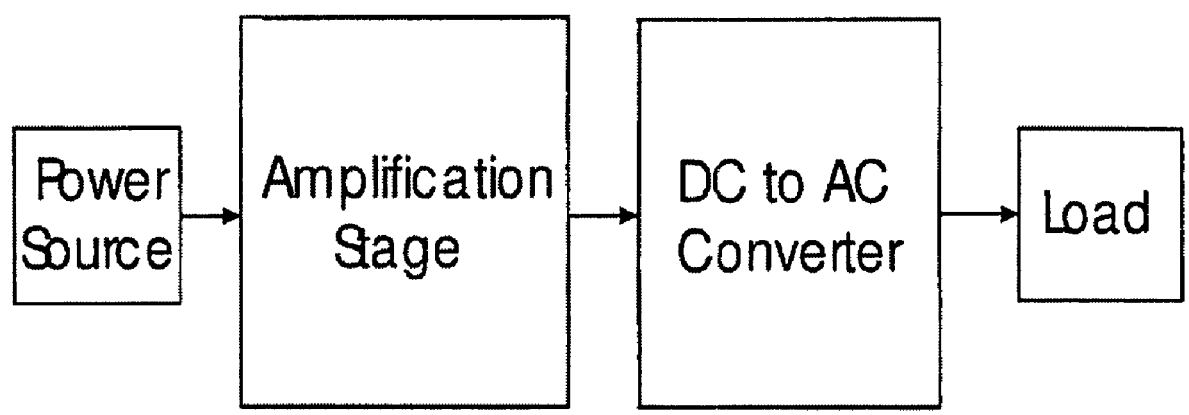
FIG. 7 shows a setup of a DC to AC converter including a voltage amplification stage.

The circuit can also be operated in grid-connected mode, in which case the load connected is active. FIG. 7 shows an implementation of the circuit in the grid-connected mode. The controller has been removed for the sake of clarity. The gate signals for transistors 5 and 7 are provided by the controller in response to a reference signal input to the controller. The reference signal may, for example, be the grid voltage frequency signal generated by 13. The current that flows through the grid in the case of sinusoidal PWM switching for 2 and 3 is as shown by 113.

Electronic Operation of Circuit

The transformer core used in the circuit is gapped to allow for energy storage. In one half cycle of the grid voltage, the transistor 7 is ON and the transistor 5 is OFF. In the other half cycle the transistor 5 is ON and the transistor 7 is OFF. During the time in which the transistor 7 is ON, the transistor 3 is repeatedly switched ON and OFF at high frequency. The duty cycle for switching transistor 3 is varied during this time in order to produce a sinusoidal PWM pulse train. When the transistor 3 is ON, the connected end of the transformer primary winding is clamped to ground. Current builds up in the part of the winding as a result. This results in energy storage in the magnetic core air gap of the transformer. When transistor 3 is turned OFF, the energy stored in the air gap is released into the secondary winding of the transformer. A current therefore flows through the diode 6, the choke 11, the grid 13, the choke 10, the transistor 7 and through the secondary winding to complete the circuit. This results in power being transferred from the DC source to the load or grid. In the other grid half-cycle, switching the transistor 2 repeatedly whilst the transistor 5 is ON results in power transfer into the grid.

We will now describe further embodiments of the present invention.

The DC to AC Converter and Voltage Amplification Stage

The proposed DC to AC converter circuit can be used in conjunction with various voltage amplification stages to suit particular applications. The amplification stage can be included before the proposed power circuit. The block diagram of FIG. 7 shows the generic set up.

The amplification stage can constitute either a step-up or step-down (or a combination of the two) circuit. Two of the commonly used amplification methods are discussed in the two sections that follow.

Step-up Circuit

Figure 8:
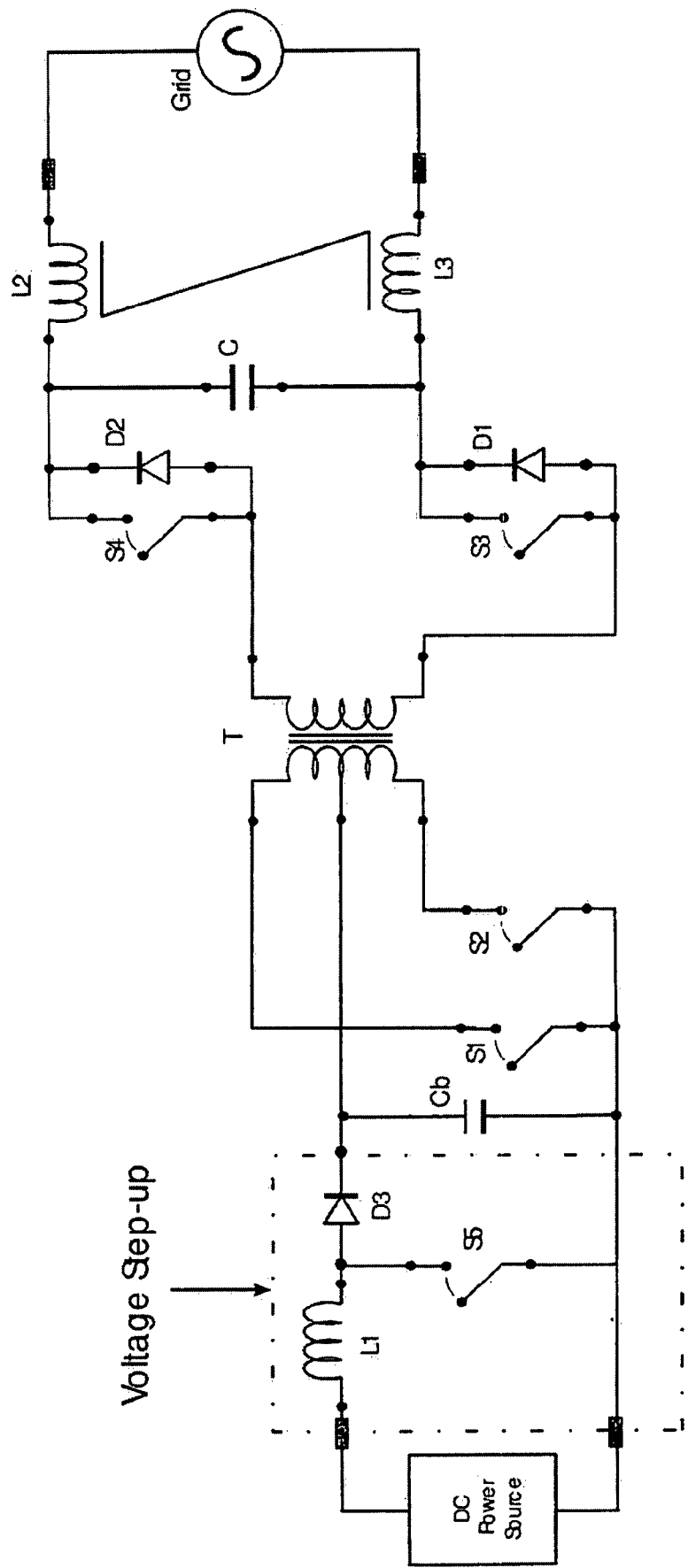
FIG. 8 shows a DC to AC converter comprising a voltage step-up circuit.

FIG. 8 shows a typical voltage step-up circuit incorporated at the front of the new DC to AC converter circuit. The step-up consists of a diode D3, a switch S5 and an inductor L1 to form a boost stage. This type of circuit set up can be used for example in many applications were the voltage appearing across capacitor Cb needs to be higher than the source voltage. A high voltage across Cb can have benefits of reducing the value of Cb required (for example, from 60 µF to 3 mF for a 150-200 W converter). For low power ranges this can lead to avoiding the use of an electrolytic based capacitor for Cb. Instead, for example, a polypropylene capacitor may be used. The boost converter may also work with 3 phase current.

another benefit would be the improvement in efficiency of the transformer as a result of reduced step-up ratio.

S5 may be, for example, a high current (5 to 10 A), low voltage switching device. The device may also be a vertical device. Preferably, the switches in the dc to ac conversion stage are lateral devices. This configuration allows the vertical and lateral devices to be fabricated on a single integrated circuit.

Alternatively, the boost converter may comprise two stages. The first stage operates at a first frequency and the second stage operates at a frequency of the AC output. The first frequency may be in the range of 10, 100 or 1000 times higher than that of the output frequency.

Step-down Circuit

Figure 9:
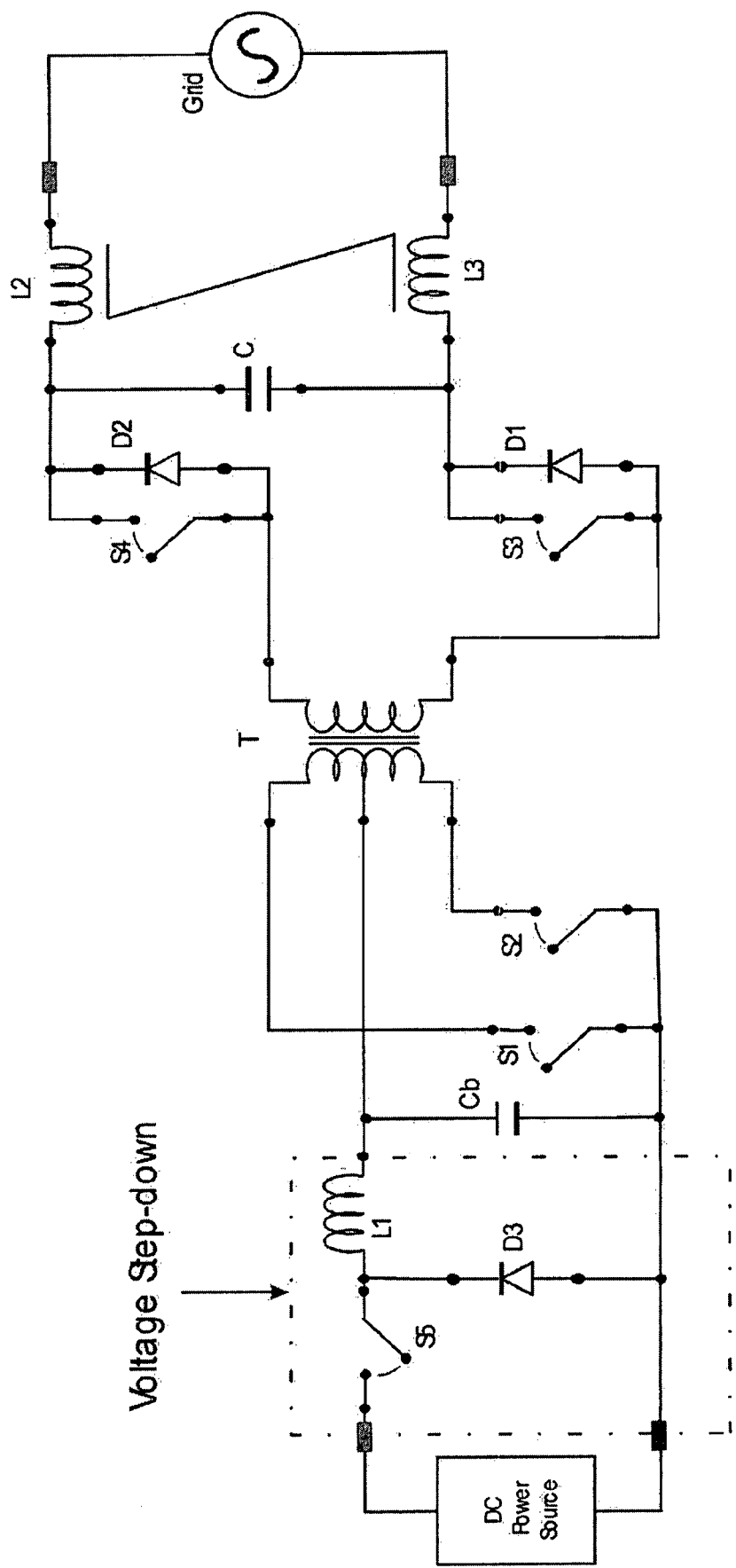
FIG. 9 shows a DC to AC converter comprising a voltage step-down circuit.

FIG. 9 shows a typical voltage step-down circuit incorporated at the front of the new DC to AC converter circuit. The step-down consists of a diode D3, a switch S5 and an inductor L1 to form a buck stage. This type of circuit set up can be used in many applications were the voltage appearing across capacitor Cb needs to be lower than the source voltage. For example a battery can be connected in parallel with Cb to form an interruptible power supply system. The circuit can also be applied in off-grid systems in which case the grid is replaced by another load.

Preferably, the amplification input stage is selectively configurable between a buck and a boost stage. Furthermore, the input stage is also selectively configurable to operate in an on-grid, off-grid or battery-powered configuration.

The switching devices may comprise MOS switching devices. Preferably, the switches are referenced to ground when switched on. Furthermore, it is preferable that the switches are driven without level shifting.

No doubt many other effective alternatives will occur to the skilled person. It will be understood that the invention is not limited to the described embodiments and encompasses modifications apparent to those skilled in the art lying within the scope of the claims appended hereto.

The invention claimed is:

1. A dc-to-ac power converter, the converter including a transformer having a primary and a secondary winding, the primary winding of said transformer being coupled to a dc input of said power converter and the secondary winding of said transformer being coupled to an ac output of said converter, and wherein the converter further comprises:
   a first pair of switches on said primary side of said converter, coupled between said dc input and said primary winding, to convert a dc supply from said dc input to an ac current for driving said transformer;
   a second pair of switches on said secondary side of said converter coupled between said secondary winding and said ac output, one in a forward path to said ac output and one in a return path from said ac output;
   a diode coupled across each of said secondary side switches; and
   a controller configured to control said primary and secondary side switches to convert a dc supply at said dc input to an ac supply at said ac output.

2. A power converter as claimed in claim 1 wherein said controller is configured to control said primary and secondary side switches such that during a first half cycle of said ac output a first of said secondary side switches is on and a second of said secondary side switches is off, and during a second half cycle of said ac output said second of said secondary side switches is on and said first of said secondary side switches is off.

3. A power converter as claimed in claim 2 wherein said controller is further configured to control said primary side switches such that during said first half cycle a first of said primary side switches generates an ac current in said primary winding and a second of said primary side switches is off, and such that during said second half cycle said first of said primary side switches is off and said second of said primary side switches generates an ac current in said primary winding.

4. A power converter as claimed in claim 3 wherein said controller is configured to control said primary side switches using a pulse width modulated control signal having pulse widths configured to generate an ac current which, when filtered, approximates a portion of a semi wave.

5. A power converter as claimed in claim 1 further comprising a filter coupled between said secondary side switches and said ac output.

6. A power converter as claimed in claim 1 configured for grid connection wherein said controller includes an input to sense a timing of an ac grid voltage for synchronising said controlling of said switches to said ac grid voltage.

7. A power converter as claimed in claim 1 wherein said primary winding has a tap connection, and wherein said dc input has first and second dc input terminals one of said dc input terminals being coupled to both of said primary side switches, the other of said dc input terminals being coupled to said tap connection.

8. A dc-to-ac power converter for providing an ac mains voltage power supply from a lower voltage dc input, the said power converter lacking an intermediate high voltage dc stage and comprising no more than four power switching devices, a first pair of power switching devices on a dc input side of said dc-to-ac converter and a second pair of power switching devices on an ac output side of said dc-to-ac converter.

9. A power converter as claimed in claim 8 wherein each of said second pair of power switching devices has a parallel-connected diode.

10. A system to convert a dc voltage input to an ac approximately sinusoidal current for a dc-to-ac power converter, the system comprising:
    a dc input with a pair of dc input terminals;
    a transformer having a primary winding with a tap and a second, output winding to provide said ac current;
    a pair of switches each coupled to one of said input terminals and to a respective end of said primary winding, said tap being connected to the other of said pair of dc input terminals; and
    a controller configured to control each of said pair of switches in turn during respective first and second half cycles of said approximately sinusoidal current using a pulse width modulated control such that each of said switches generates a current to approximate one of said half cycles of said approximate sinusoid;
    said system having an output from said output winding.

11. A DC-to-AC power converter, the converter including a transformer having a primary and a secondary winding, the primary winding of the transformer being coupled to a dc input of the power converter and the secondary winding of the transformer being coupled to an ac output of the converter, and wherein:
    a first and second switch connected to the primary winding of the transformer to convert a dc supply from the dc input to an ac current for driving the transformer;
    a first and second switch connected to the secondary winding of the transformer such that the first switch is in a forward path to the ac output and the second switch is in a return path to the ac output;
    a first and second diode coupled across the respective first and second switches connected to the secondary winding; and wherein
    the first switch connected to the primary winding of the transformer is controlled to provide a first half cycle of an ac voltage to the primary winding of the transformer;
    the second switch connected to the primary winding of the transformer is controlled to provide a second half cycle of an ac voltage to the primary winding of the transformer; and
    the first and second switches connected to the secondary winding of the transformer as switched to alternately conduct the first and second half cycles of the signal coupled from the primary winding of the transformer to the secondary winding of the transformer.

12. A power converter as claimed in claim 11, further comprising a controller to control the first and second switches connected to the primary winding of the transformer and the first and second switched connected to the secondary winding of the transformer.

13. A power converter as claimed in claims 11, wherein the first and second switches connected to the primary winding of the transformer are controlled to provide a substantially sinusoidal signal to the primary winding of the transformer.

14. A power converter as claimed in claim 13, wherein the first and second switches are pulse width modulated.

15. A power converter as claimed in claim 11, further comprising a filter connected to the ac output.

16. A controller for controlling a DC to AC power converter, the power converter comprising a transformer having a primary winding and a secondary winding, a first and second switch connected to the primary winding of the transformer, a first switch connected to the secondary winding of the transformer in the forward path to an ac output and second switch connected to the secondary winding of the transformer in the return path to the ac output, and a first and second diode coupled across the respective first and second switches connected to the secondary winding; the controller comprising:
a plurality of outputs to control each of the first and second switches connected to the primary winding of the transformer and first and second switches connected to the secondary winding of the transformer;
wherein the controller controls the first and second switches connected to the primary winding of the transformer to convert a dc input to an ac current to drive the primary winding of the transformer;
the controller controls the first and second switches connected to the secondary winding of the transformer to alternately conduct the first and second half cycles of the signal coupled from the primary winding of the transformer to the secondary winding of the transformer.

17. A controller as claimed in claim 16, wherein the controller controls the switches such that the ac current is substantially sinusoidal.

18. A controller as claimed in claims 16, further comprising a grid sense input to sense a signal present on a grid.

19. A controller as claimed in claim 18, wherein the controller controls the first and second switches connected to the primary winding of the transformer such that the ac current is substantially the same as the grid sense input.

20. A dc-to-ac power converter or system as claimed in claim 1 further comprising a non-electrolytic capacitor energy storage capacitor on a dc side of said converter or system.

21. A dc-to-ac power converter or system as claimed in claim 20 further comprising a boost converter coupled to the dc input to said converter or system, and wherein said non-electrolytic capacitor is coupled across an output of said boost converter.

22. A dc-to-ac power converter having a dc input, a dc-to-ac conversion stage having an input coupled to said dc input and an ac output coupled to an output of said dc-to-ac conversion stage, and further comprising a non-electrolytic energy-storage capacitor coupled to said input of said dc-to-ac conversion stage.

23. A power converter as claimed in claim 22 further comprising a boost converter coupled between said dc input and said conversion stage input.

24. A power converter as claimed in claim 22 wherein said conversion stage comprises a first stage operating at a first frequency and coupled to a second stage operating at a frequency of said ac output, said first frequency having higher than said output frequency.

25. A power converter as claimed in claim 22, wherein said first frequency is 10, 100 or 1000 times higher than said output frequency.

26. A power converter as claimed in claim 24 wherein said first stage is configured to convert a dc to an ac current.

27. A power converter as claimed in claim 22 wherein said ac output is a single phase output.

28. A dc-to-ac power converter having a dc input, a dc-to-ac conversion stage having an input coupled to said dc input and an ac output coupled to an output of said dc-to-ac conversion stage, wherein said dc-to-ac conversion stage comprises a plurality of MOS switching devices, and wherein all of said switching devices are referenced to ground when switched on.

29. A dc-to-ac power converter having a dc input, a dc-to-ac conversion stage having an input coupled to said dc input and an ac output coupled to an output of said dc-to-ac conversion stage, wherein said dc-to-ac conversion stage comprises a plurality of MOS switching devices, and wherein said switching devices are driven without level shifting.

30. A dc-to-ac power converter having a dc input, a dc-to-ac conversion stage having an input coupled to said dc input and an ac output coupled to an output of said dc-to-ac conversion stage further comprising a boost converter coupled between said dc input and said conversion stage input, wherein said dc-to-ac conversion stage comprises a plurality of MOS switching devices, and wherein said boost converter comprises at least one MOS switching device, and wherein said boost converter switching device is a vertical device and wherein said dc-to-ac conversion stage devices are lateral devices.

31. A dc-to-ac power converter as claimed in claim 29 wherein said vertical device and said lateral devices are fabricated on a single integrated circuit.

32. A dc-to-ac power converter having a dc input, a dc-to-ac conversion stage having an input coupled to said dc input and an ac output coupled to an output of said dc-to-ac conversion stage and further comprising an input stage coupled between said dc input and said conversion stage input, and wherein said input stage is selectably configurable between a boost converter and a buck converter.

33. A dc-to-ac power converter having a dc input, a dc-to-ac conversion stage having an input coupled to said dc input and an ac output coupled to an output of said dc-to-ac conversion stage and further comprising an input stage coupled between said dc input and said conversion stage input, and wherein said input stage is selectably configurable such that the converter is configured to operate in either an on-grid configuration or an off-grid, battery powered configuration.

34. An integrated circuit comprising at least one power switching device, a diode, and at least one second switching device connected such that in a first configuration said integrated circuit has terminals for connecting to external components including at least a coil and a capacitor to implement a boost converter and such that in a second configuration, which when said terminals are connected in the same way, implements a buck converter and further comprising a controller, the controller having an input for selecting between said two configurations.

* * * * *

US007626834C1

(12) EX PARTE REEXAMINATION CERTIFICATE (9177th)
United States Patent
Chisenga et al.

(10) Number: US 7,626,834 C1
(45) Certificate Issued: Aug. 7, 2012

(54) DOUBLE ENDED CONVERTER WITH OUTPUT SYNCHRONOUS RECTIFIER AND AUXILIARY INPUT REGULATOR

(75) Inventors: Lesley Chisenga, Cambridge (GB); Asim Mumtaz, Cambridge (GB); Gehan Amil Joseph Amaratunga, Cambridge (GB)

(73) Assignee: Enecsys Limited, Cambridge (GB)

Reexamination Request:
No. 90/011,788, Jul. 8, 2011

Reexamination Certificate for:
Patent No.: 7,626,834
Issued: Dec. 1, 2009
Appl. No.: 11/771,593
Filed: Jun. 29, 2007

(51) Int. Cl.
*H02M 3/335* (2006.01)
*H02M 7/538* (2006.01)

(52) U.S. Cl. .......................................... 363/25; 363/134
(58) Field of Classification Search ................. None
See application file for complete search history.

(56) References Cited

To view the complete listing of prior art documents cited during the proceeding for Reexamination Control Number 90/011,788, please refer to the USPTO's public Patent Application Information Retrieval (PAIR) system under the Display References tab.

*Primary Examiner* — Margaret Rubin

(57) ABSTRACT

A DC to AC power coverter is disclosed. The power converter has four power-switching devices, two diodes, a step-up and isolation transformer, a capacitor-choke filter and a controller. Two power-switching devices located on the primary side of the transformer are switched to provide alternate cycles of an ac current to the primary side of the transformer, which magnetically couples the ac current to the secondary side of the transformer. Two power-switching devices on the secondary side of the transformer are switched to alternately allow the forward and return ac currents from the secondary side of the transformer in the output path to a load connected to the output of the DC to AC power converter.

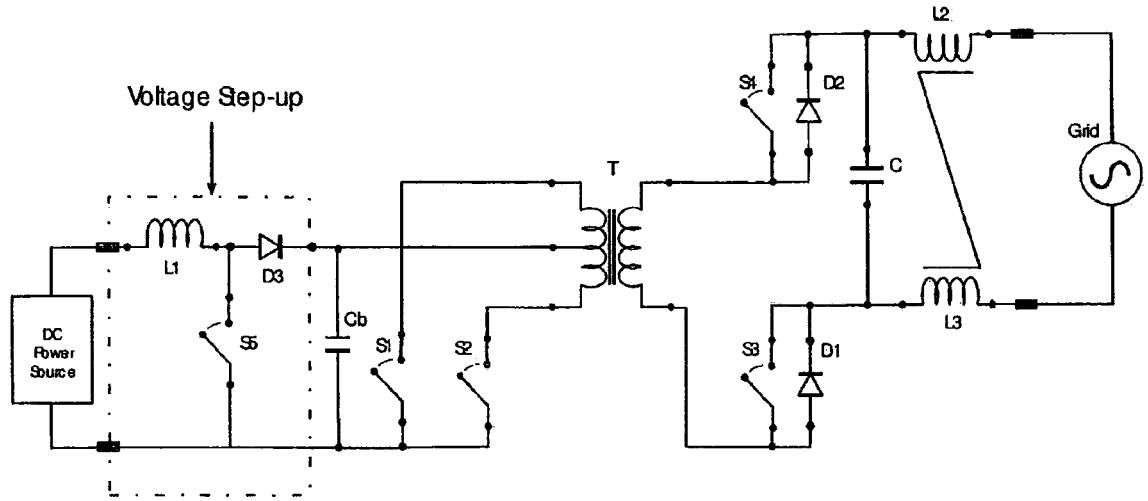

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 22 and 24 are determined to be patentable as amended.

Claims 23, 26 and 27, dependent on an amended claim, are determined to be patentable.

New claims 35-38 are added and determined to be patentable.

Claims 1-21, 25 and 28-34 were not reexamined.

22. A dc-to-ac power converter having a dc input, a dc-to-ac conversion stage having an input coupled to said dc input and an ac ouput coupled to an output of said dc-to-ac conversion stage, and further comprising a non-electrolytic energy-storage capacitor coupled to said input of said dc-to-ac conversion stage; *wherein said dc-to-ac conversion stage comprises a first stage coupled to said dc input and operating at a first frequency to convert a dc to an ac current, wherein said first stage is coupled to a second stage operating at a second, different frequency, and wherein said second stage is coupled to said ac output, wherein said dc-to-ac conversion stage further comprises a transformer having a primary winding and a secondary winding, wherein said primary winding forms part of said first stage and said secondary winding forms part of said second stage, and wherein said first and second stages are coupled to one another by said transformer.*

24. [A power converter as claimed in claim 22] *A dc-to-ac power converter having a dc input, a dc-to-ac conversion stage having an input coupled to said dc input and an ac output coupled to an output of said dc-to-ac conversion stage, and further comprising a non-electrolytic energy-storage capacitor coupled to said input of said dc-to-ac conversion stage,* wherein said *dc-to-ac* conversion stage comprises a first stage operating at a first frequency and coupled to a second stage operating at a frequency of said ac output, said first frequency having *a* higher *frequency* than said output frequency.

*35. A dc-to-ac converter as claimed in claim 22 wherein said transformer comprises two primary windings, wherein a first end of a first of said primary windings is connected to a second end of a second of said primary windings and to a first connection from said dc input, and wherein each of a second end of said first of said primary windings and a first end of said second of said primary windings is connected to a first terminal of a respective switch, and wherein a second terminal of each respective switch is connected to a second connection from said dc input; and wherein said second stage of said dc-to-ac converter comprises two further switches, wherein each of said further switches has a first terminal connected to each respective end of said secondary winding of said transformer, and wherein each of said further switches has a second terminal connected to a respective connection to said ac output.*

*36. A dc-to-ac converter as claimed in claim 22 wherein said dc-to-ac conversion stage further comprises a further non-electrolytic capacitor coupled to a winding on a secondary side of said transformer via one or more switches.*

*37. A dc-to-ac power converter as claimed in claim 22 wherein said transformer comprises two primary windings, wherein a first end of a first of said primary windings is connected to a second end of a second of said primary windings and to a first connection from said dc input, and wherein each of a second end of said first of said primary windings and a first end of said second of said primary windings is connected to a first terminal of a respective switch, and wherein a second terminal of each respective switch is connected to a second connection from said dc input; and wherein said second stage of said dc-to-ac converter comprises two further switches, wherein each of said further switches has a first terminal connected to each respective end of said secondary winding of said transformer, and wherein each of said further switches has a second terminal connected to a respective connection to said ac output; and wherein said dc-to-ac conversion stage further comprises a further non-electrolytic capacitor coupled to a winding on a secondary side of said transformer via one or more switches.*

*38. A dc-to-ac converter having a dc input, a dc-to-ac conversion stage having an input coupled to said dc input and an ac output coupled to an output of said dc-to-ac conversion stage, and further comprising a non-electrolytic energy-storage capacitor coupled to said input of said dc-to-ac conversion stage; wherein said conversion stage comprises a first stage operating at a first frequency and coupled to a second stage operating at a frequency of said ac output, said first frequency having a higher frequency than said output frequency; and, wherein said first frequency is 10, 100 or 1000 times higher than said output frequency.*

\* \* \* \* \*

(12) EX PARTE REEXAMINATION CERTIFICATE (10268th)

United States Patent
Chisenga et al.

(10) Number: US 7,626,834 C2
(45) Certificate Issued: Aug. 21, 2014

(54) DOUBLE ENDED CONVERTER WITH OUTPUT SYNCHRONOUS RECTIFIER AND AUXILIARY INPUT REGULATOR

(75) Inventors: Lesley Chisenga, Cambridge (GB); Asim Mumtaz, Cambridge (GB); Gehan Amil Joseph Amaratunga, Cambridge (GB)

(73) Assignee: Enecsys Limited, Cambridge, Cambridgeshire (GB)

Reexamination Request:
No. 90/012,446, Aug. 22, 2012

Reexamination Certificate for:
Patent No.: 7,626,834
Issued: Dec. 1, 2009
Appl. No.: 11/771,593
Filed: Jun. 29, 2007

Reexamination Certificate C1 7,626,834 issued Aug. 7, 2012

(51) Int. Cl.
*H02M 3/335* (2006.01)
*H02M 7/538* (2007.01)

(52) U.S. Cl.
USPC .............. 363/25; 363/134; 363/24; 363/26; 363/139; 363/89; 363/86

(58) Field of Classification Search
USPC .............. 363/24, 25, 26, 37, 66, 67, 71, 134, 363/139; 307/64, 66, 82
See application file for complete search history.

(56) References Cited

To view the complete listing of prior art documents cited during the proceeding for Reexamination Control Number 90/012,446, please refer to the USPTO's public Patent Application Information Retrieval (PAIR) system under the Display References tab.

*Primary Examiner* — Pia Tibbits

(57) ABSTRACT

A DC to AC power coverter is disclosed. The power converter has four power-switching devices, two diodes, a step-up and isolation transformer, a capacitor-choke filter and a controller. Two power-switching devices located on the primary side of the transformer are switched to provide alternate cycles of an ac current to the primary side of the transformer, which magnetically couples the ac current to the secondary side of the transformer. Two power-switching devices on the secondary side of the transformer are switched to alternately allow the forward and return ac currents from the secondary side of the transformer in the output path to a load connected to the output of the DC to AC power converter.

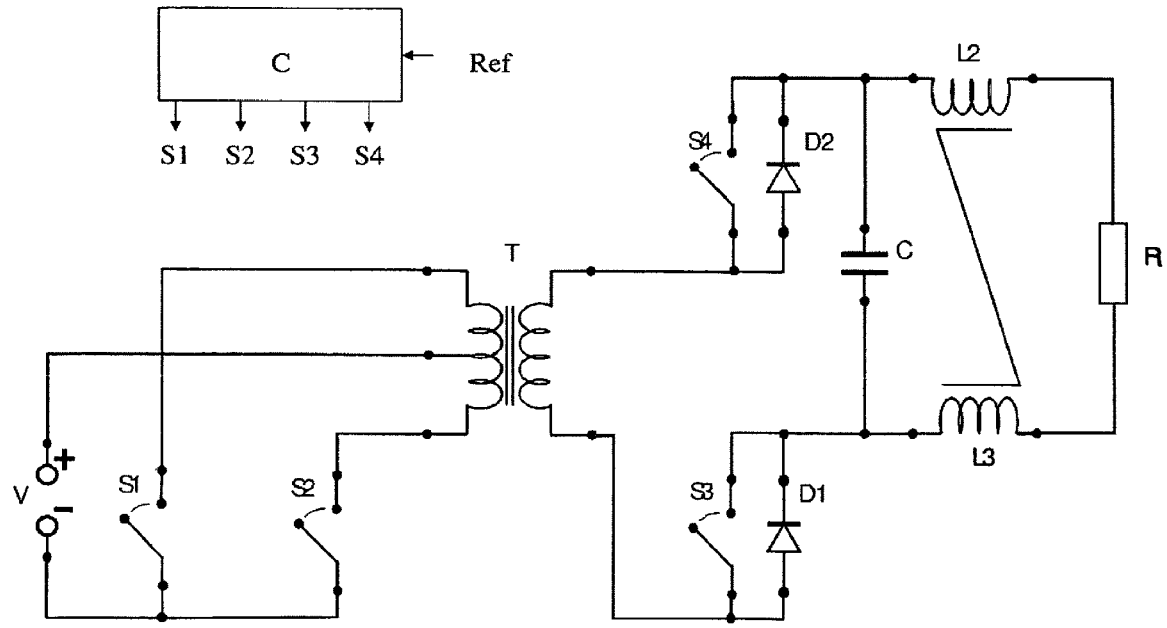

US 7,626,834 C2

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 36 and 37 were previously cancelled.

Claims 1, 22 and 27 are cancelled.

Claims 5, 6, 20 and 24 are determined to be patentable as amended.

Claim 26, dependent on an amended claim, is determined to be patentable.

New claims 39-53 are added and determined to be patentable.

Claims 2-4, 7-19, 21, 23, 25, 28-35 and 38 were not reexamined.

5. A power converter as claimed in claim [1] *7* further comprising a filter coupled between said secondary side switches and said ac output.

6. A power converter as claimed in claim [1] *7* configured for grid connection wherein said controller includes an input to sense a timing of an ac grid voltage for synchronising said controlling of said switches to said ac grid voltage.

20. A dc-to-ac power converter [or system] as claimed in claim [1] *7* further comprising a non-electrolytic [capacitor] energy storage capacitor on a dc side of said converter[or system].

24. A dc-to-ac power converter having a dc input, a dc-to-ac conversion stage having an input coupled to said dc input and an ac output coupled to an output of said dc-to-ac conversion stage, and further comprising a non-electrolytic energy-storage capacitor coupled to said input of said dc-to-ac conversion stage, wherein said dc-to-ac conversion stage comprises a first stage operating at a first frequency and coupled to a second stage operating at a frequency of said ac output, said first frequency having a higher frequency than said output frequency, *wherein the second stage comprises only two power switches, wherein the two power switches are not directly connected to each other.*

*39. A dc-to-ac power converter, the converter including a transformer having a primary and a secondary winding, the primary winding of said transformer being coupled to a dc input of said power converter and the secondary winding of said transformer being coupled to an ac output of said converter, and wherein the converter further comprises:*

*a pair of power switches on said primary side of said converter, coupled between said dc input and said primary winding, to convert a dc supply from said dc input to an ac current for driving said transformer;*

*only two power switches on said secondary side of said converter coupled between said secondary winding and said ac output, one in a forward path to said ac output and one in a return path from said ac output, wherein each of the two power switches on the secondary side and the secondary winding comprises a first terminal and a second terminal, wherein the first terminal of a first of said two power switches on the secondary side is connected to the first terminal of the secondary winding, wherein the second terminal of the first of said two power switches on the secondary side is connected to a first terminal of a capacitor, wherein the first terminal of a second of said two power switches on the secondary side is connected to the second terminal of the secondary winding, wherein the second terminal of the second of said two power switches on the secondary side is connected to a second terminal of said capacitor;*

*a diode coupled across each of said secondary side switches; and*

*a controller configured to control said primary and secondary side switches to convert a dc supply at said dc input to an ac supply at said ac output.*

*40. A power converter as claimed in claim 39 further comprising a filter coupled between said secondary side switches and said ac output.*

*41. A power converter as claimed in claim 39 configured for grid connection wherein said controller includes an input to sense a timing of an ac grid voltage for synchronising said controlling of said switches to said ac grid voltage.*

*42. A power converter as claimed in claim 39 further comprising a non-electrolytic energy storage capacitor on a dc side of said converter.*

*43. A dc-to-ac power converter, the converter including a transformer having a primary and a secondary winding, the primary winding of said transformer being coupled to a dc input of said power converter and the secondary winding of said transformer being coupled to an ac output of said converter, and wherein the converter further comprises:*

*only two power switches on said primary side of said converter, coupled between said dc input and said primary winding, to convert a dc supply from said dc input to an ac current for driving said transformer;*

*only two power switches on said secondary side of said converter coupled between said secondary winding and said ac output, one in a forward path to said ac output and one in a return path from said ac output;*

*a diode coupled across each of said secondary side switches; and*

*a controller configured to control said primary and secondary side switches to convert a dc supply at said dc input to an ac supply at said ac output;*

*wherein all power switches on said primary and secondary sides are referenced to ground when switched on.*

*44. A power converter as claimed in claim 43 further comprising a filter coupled between said secondary side switches and said ac output.*

*45. A power converter as claimed in claim 43 configured for grid connection wherein said controller includes an input to sense a timing of an ac grid voltage for synchronising said controlling of said switches to said ac grid voltage.*

*46. A power converter as claimed in claim 43 further comprising a non-electrolytic energy storage capacitor on a dc side of said converter.*

*47. A dc-to-ac power converter, the converter including a transformer having a primary and a secondary winding, the primary winding of said transformer being coupled to a dc input of said power converter and the secondary winding of said transformer being coupled to an ac output of said converter, and wherein the converter further comprises:*

*a first pair of switches on said primary side of said converter, coupled between said dc input and said primary winding, to convert a dc supply from said dc input to an ac current for driving said transformer;* a second pair of switches on said secondary side of said converter coupled between said secondary winding and said ac output, one in a forward path to said ac output and one in a return path from said ac output;

a diode coupled across each of said secondary side switches; and a controller configured to control said primary and secondary side switches to convert a dc supply at said dc input to an ac supply at said ac output, wherein the controller is further configured to control the first pair of switches such that during a first half cycle of said ac output a first of said first pair of switches is off and a second of said first pair of switches is turned on and off a plurality of times, and during a second half cycle of said ac output said second of said first pair of switches is off and said first of said first pair of switches is turned on and off a plurality of times.

48. A power converter as claimed in claim 47, wherein the controller is further configured to control the second pair of switches such that during the first half cycle of said ac output a first of said second pair of switches is off and a second of said second pair of switches is on, and during the second half cycle of said ac output said second of said second pair of switches is off and said first of said second pair of switches is on.

49. A power converter as claimed in claim 47 further comprising a filter coupled between said secondary side switches and said ac output.

50. A power converter as claimed in claim 47 configured for grid connection wherein said controller includes an input to sense a timing of an ac grid voltage for synchronising said controlling of said switches to said ac grid voltage.

51. A power converter as claimed in claim 47 further comprising a non-electrolytic energy storage on a dc side of said converter.

52. A dc-to-ac power converter having a dc input, a dc-to-ac conversion stage having an input coupled to said dc input and an ac output coupled to an output of said dc-to-ac conversion stage, and further comprising a non-electrolytic energy-storage capacitor coupled to said input of said dc-to-ac conversion stage; wherein said dc-to-ac conversion stage comprises a first stage coupled to said dc input and operating at a first frequency to convert a dc to an ac current, wherein said first stage is coupled to a second stage operating at a second, different frequency, and wherein said second stage is coupled to said ac output, wherein said dc-to-ac conversion stage further comprises a transformer having a primary winding and a secondary winding, wherein said primary winding forms part of said first stage and said secondary winding forms part of said second stage, and wherein said first and second stages are coupled to one another by said transformer, wherein the second stage comprises only two power switches, wherein each of the two power switches and the secondary winding comprises a first terminal and a second terminal, wherein the first terminal of a first of said two power switches is connected to the first terminal of the secondary winding, wherein the second terminal of the first of said two power switches is connected to a first terminal of a capacitor, wherein the first terminal of a second of said two power switches is connected to the second terminal of the secondary winding, wherein the second terminal of the second of said two power switches is connected to a second terminal of said capacitor.

53. A power converter as claimed in claim 52 wherein said ac output is a single phase output.

* * * * *